US006584452B1

(12) United States Patent
Prieto, Jr. et al.

(10) Patent No.: US 6,584,452 B1
(45) Date of Patent: Jun. 24, 2003

(54) COMMUNICATION SATELLITE RESOURCE TRADING TECHNIQUES

(75) Inventors: Jaime L. Prieto, Jr., Torrance, CA (US); Oliver W. Saunders, Los Angeles, CA (US)

(73) Assignee: Northrop Grumman Corporation, Redondo Beach, CA (US)

(*) Notice: Subject to any disclaimer, the term of this patent is extended or adjusted under 35 U.S.C. 154(b) by 0 days.

(21) Appl. No.: 09/351,958

(22) Filed: Jul. 12, 1999

(51) Int. Cl.[7] .............................................. G06F 17/60
(52) U.S. Cl. ........................................ 705/37; 379/116
(58) Field of Search ..................... 705/8, 37; 370/330, 370/317, 318; 379/112, 114, 115, 120, 116

(56) References Cited

U.S. PATENT DOCUMENTS

| | | | |
|---|---|---|---|
| 5,794,207 A | | 8/1998 | Walker et al. |
| 5,835,716 A | * | 11/1998 | Hunt et al. ................... 705/37 |
| 5,978,363 A | * | 11/1999 | Dimitrijevic et al. ....... 370/319 |
| 5,995,602 A | * | 11/1999 | Johnson et al. ............. 379/112 |
| 6,005,925 A | * | 12/1999 | Johnson et al. ............. 379/112 |
| 6,006,194 A | * | 12/1999 | Merel ........................... 705/12 |
| 6,049,774 A | * | 4/2000 | Roy ............................... 705/8 |
| 6,061,789 A | * | 5/2000 | Hauser et al. .............. 713/168 |
| 6,144,727 A | * | 11/2000 | Mashinsky ................... 379/112 |
| 6,151,589 A | * | 11/2000 | Aggarwal et al. ............ 705/37 |
| 6,167,124 A | * | 12/2000 | Johnson et al. ............. 379/112 |
| 6,321,207 B1 | * | 11/2001 | Ye ................................ 705/8 |
| 6,377,561 B1 | * | 4/2002 | Black et al. ................. 370/318 |
| 6,381,228 B1 | * | 4/2002 | Prieto, Jr. et al. ........... 370/323 |

FOREIGN PATENT DOCUMENTS

EP          1 069 709 A2 *  1/2001  ........... H04B/7/185

OTHER PUBLICATIONS

Barry, J. M.; Sary C. "Expert System for On-Board Satellite Scheduling and Control" 1988, (NASA Conf. Publ. 3013) p 193–203.*
China And France To Share Satellite Technology, Communications Today, Feb. 1999, pNA.*
"It Was My Idea", The Economist, p. 54, Aug. 15, 1998.

* cited by examiner

Primary Examiner—Kenneth R. Rice
Assistant Examiner—Lynda Jasmin
(74) Attorney, Agent, or Firm—McAndrews, Held & Malloy, Ltd.

(57) ABSTRACT

Techniques for trading satellite communication resources include a net work operations controller 80 for receiving an offer and analyzing bids in response to the offer. The network operations controller at least partially revises a downlink schedule of resources in response to the winning bid. A satellite 10 receives information from the network operations controller 80 and configures a switch 50 in the satellite, as well as the downlink schedule, in order to enable data communications through the satellite by the winning bidder.

30 Claims, 10 Drawing Sheets

COMMUNICATION SATELLITE RESOURCE TRADING TECHNIQUES

BACKGROUND OF THE INVENTION

This invention relates to communication satellites and more particularly relates to the scheduling and trading of resources for such satellites.

Efficient use of resources in a communication satellite is important because the capability of expanding the resources after launch is essentially nonexistent. Wholesalers typically subscribe to blocks of such resources, and retailers typically subscribe to portions of such blocks of resources. However, due to variations in demand among wholesalers and retailers, the resources are not always fully utilized. As a result, there is a need for efficient marketing of satellite communication resources to ensure that the satellite resources, including satellite bandwidth, are utilized to the maximum possible extent. There also is a need for a technique of efficiently trading satellite resources so that the resources are as fully utilized as possible on a real-time basis. This invention meets those needs.

BRIEF SUMMARY OF THE INVENTION

The present invention is useful in a satellite communication system comprising an earth orbiting satellite for transmitting data in accordance with a schedule of satellite resources. By using the invention, the resources can be traded in real time with efficiency and dispatch. According to a preferred embodiment, an offer of at least a portion of the satellite resources is stored along with bids for the offered satellite resources. The storing preferably is accomplished in digital memories. The bids are then analyzed, and at least one of the bids is selected. The satellite data transmitting schedule then is altered in accordance with each selected bid. The analyzing, selecting and altering is preferably accomplished by digital processors, such as microprocessors or microcontrollers.

According to an apparatus mode of the preferred embodiment, a communication network interconnects the one or more memories, one or more processors and the satellite so that the resources may be efficiently traded with dispatch.

The foregoing techniques provide important product differentiation for satellite network/payload to manufacturers. In addition, they add great flexibility to satellite processed payloads and potential value for network service providers and bandwidth wholesalers. In addition, the techniques tend to maximize satellite communication data throughput and revenue.

DETAILED DESCRIPTION OF THE INVENTION

Figure 1:
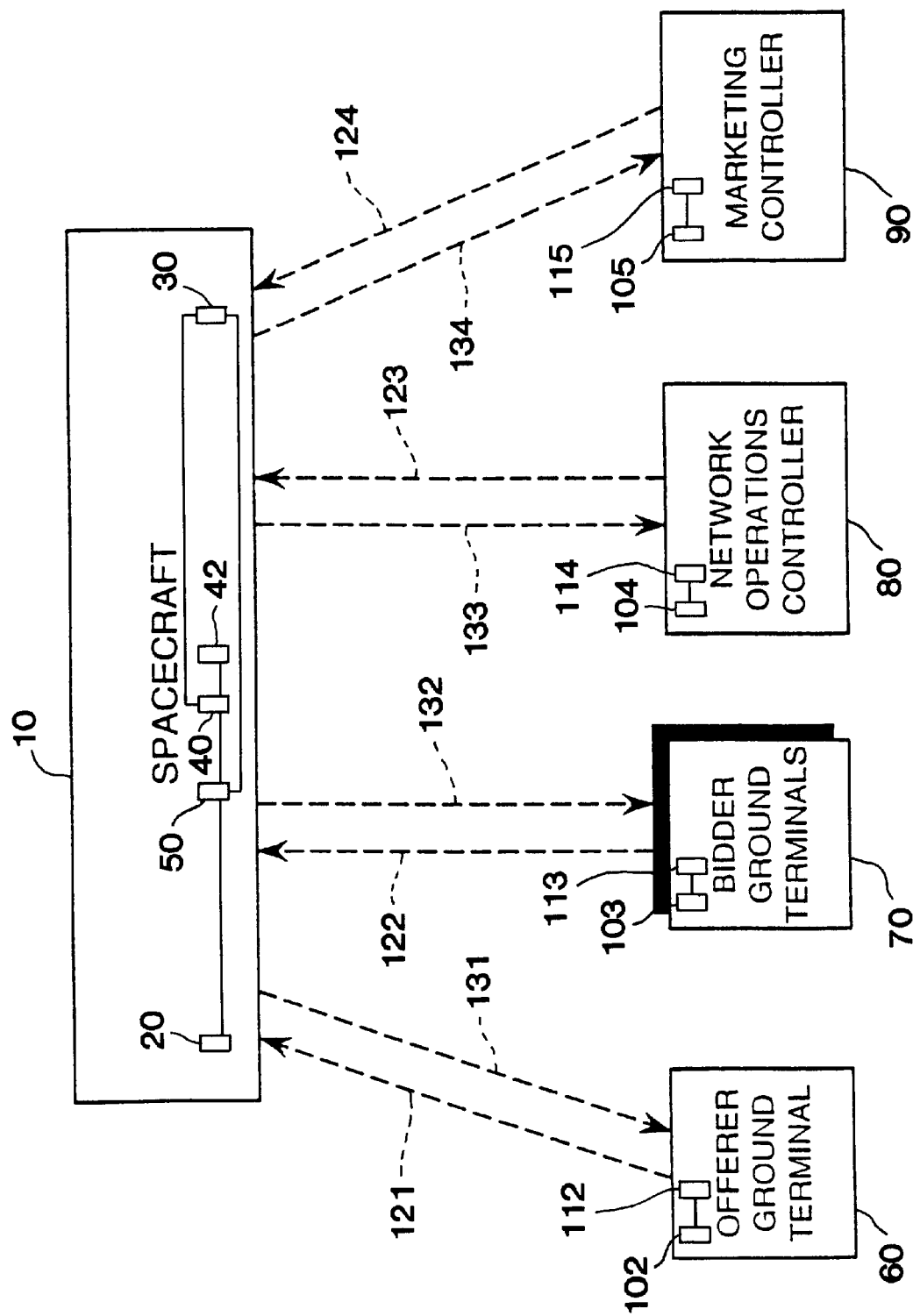
FIG. 1 is a schematic block diagram of a preferred form of apparatus made in accordance with the present invention in which a spacecraft or satellite is linked to an offerer ground terminal, one or more bidder ground terminals, a network operations controller and a marketing controller via-satellite communication links.

Referring to FIG. 1, a preferred form of the invention includes a satellite or spacecraft 10 which is orbiting the earth. The spacecraft includes a conventional uplink module 20 for receiving communications from the ground and processing those communications for switching within the satellite. Satellite 10 also includes a conventional downlink module 30 for processing switched data for communications with the ground on a satellite downlink. Satellite 10 also includes a microprocessor 40 coupled to a memory 42 as shown which controls the operation of uplink module 20, downlink module 30 and a switch 50 that switches the data received from uplink module 20 to downlink module 30. In a well known manner, switch 50 and downlink module 30 are able to switch data to various beams in a downlink in order to control the geographic area into which the data is transmitted.

Figure 3:
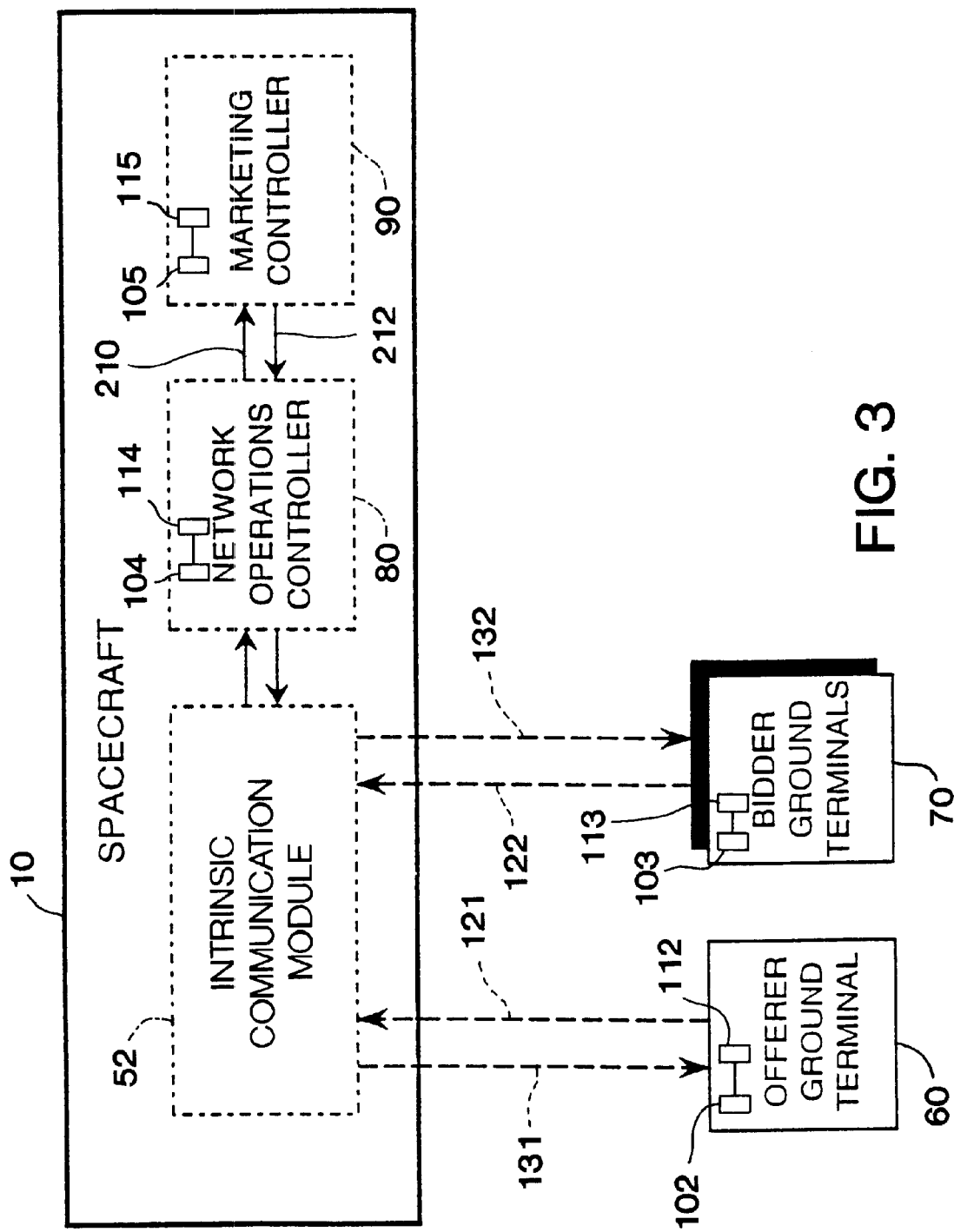
FIG. 3 is a schematic block diagram of the type of system shown in FIG. 1 in which the network operations controller and marketing controller are located on the satellite.
Figure 4:
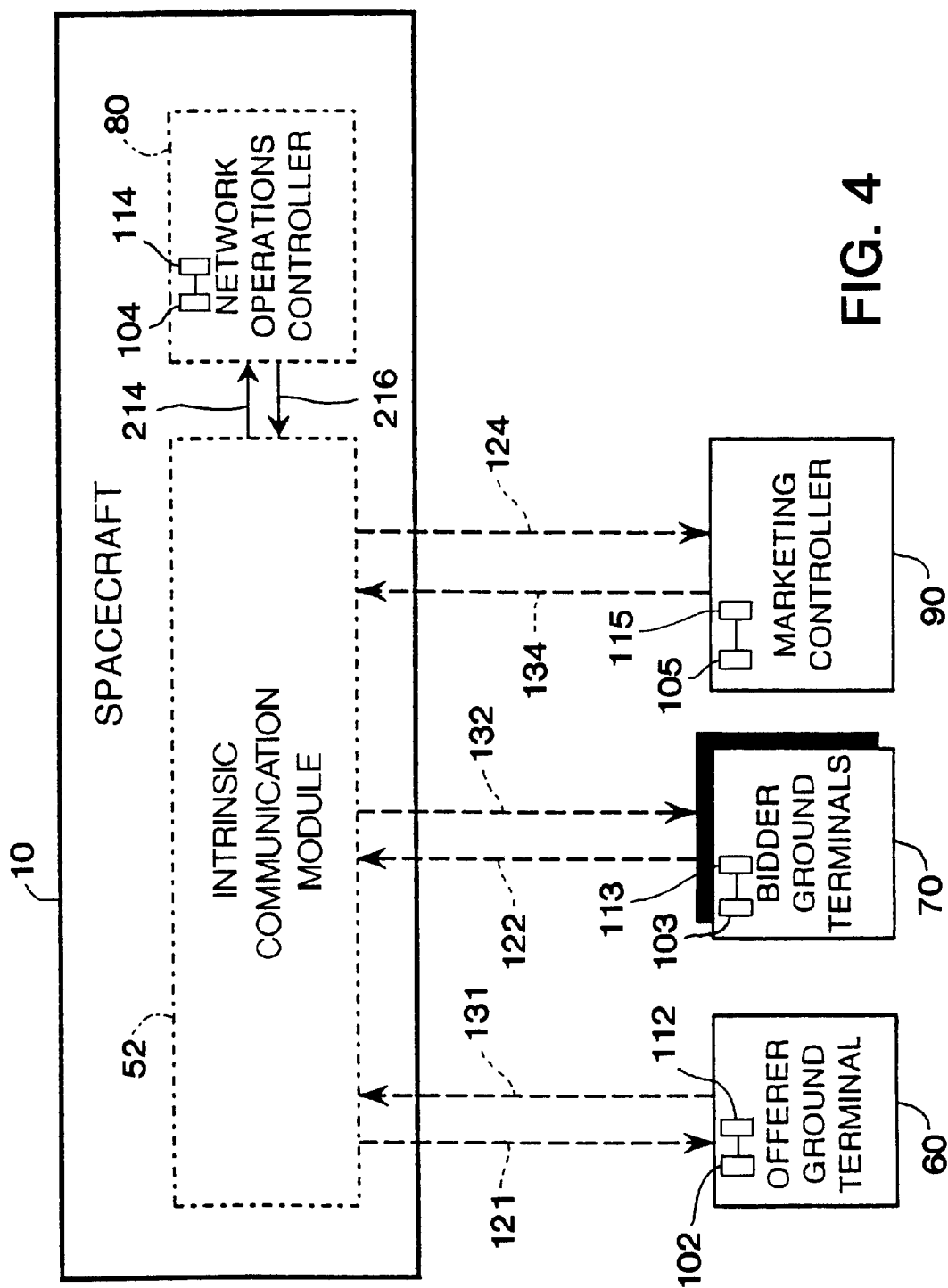
FIG. 4 is a schematic block diagram of the type of system shown in FIG. 1 in which the network operations controller is located on the satellite.

Referring to FIGS. 3 and 4, satellite 10 also includes an intrinsic communication module 52 that enables communication with the ground via uplink module 20 and downlink module 30.

Figure 9:
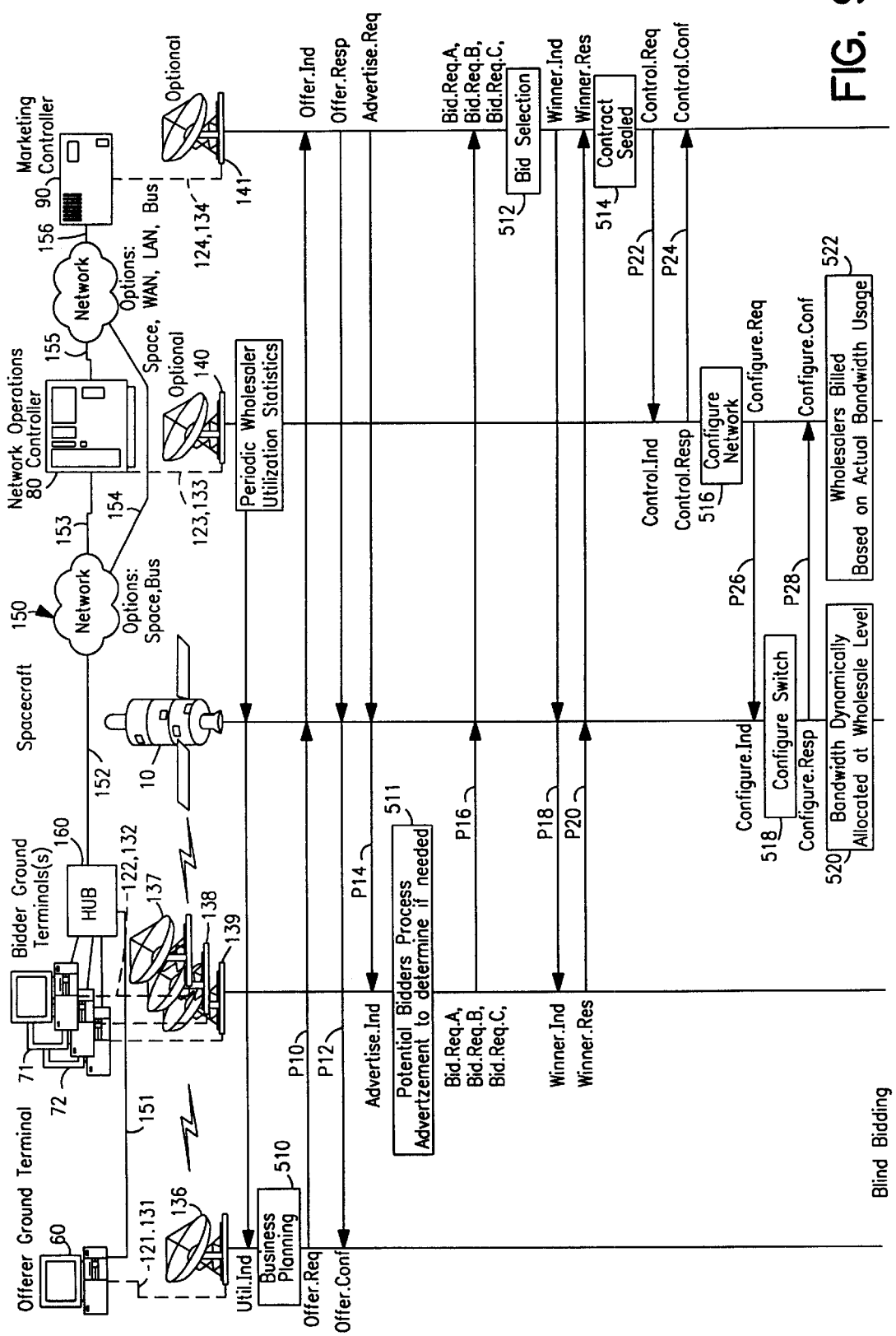
FIG. 9 is a schematic block diagram of a preferred form of the type of system as .shown in FIG. 1, together with a flow diagram illustrating a blind bidding embodiment of the invention.

Referring to FIGS. 1 and 9, the system includes an offerer ground terminal 60, as well as bidder ground terminals 70–72. A ground based network operations controller 80 and a ground based marketing controller 90 enable the trading of satellite resources in a manner described later. Still referring to FIG. 1, microprocessors 102–105 and related memories 112–115, respectively, are connected as shown and are located in the terminals and controllers as shown in FIG. 1.

The system includes conventional satellite communications uplinks 121–124 and related satellite communication downlinks 131–134 which enable communications between the satellite and the terminals and controllers as shown in FIG. 1.

Figure 2:
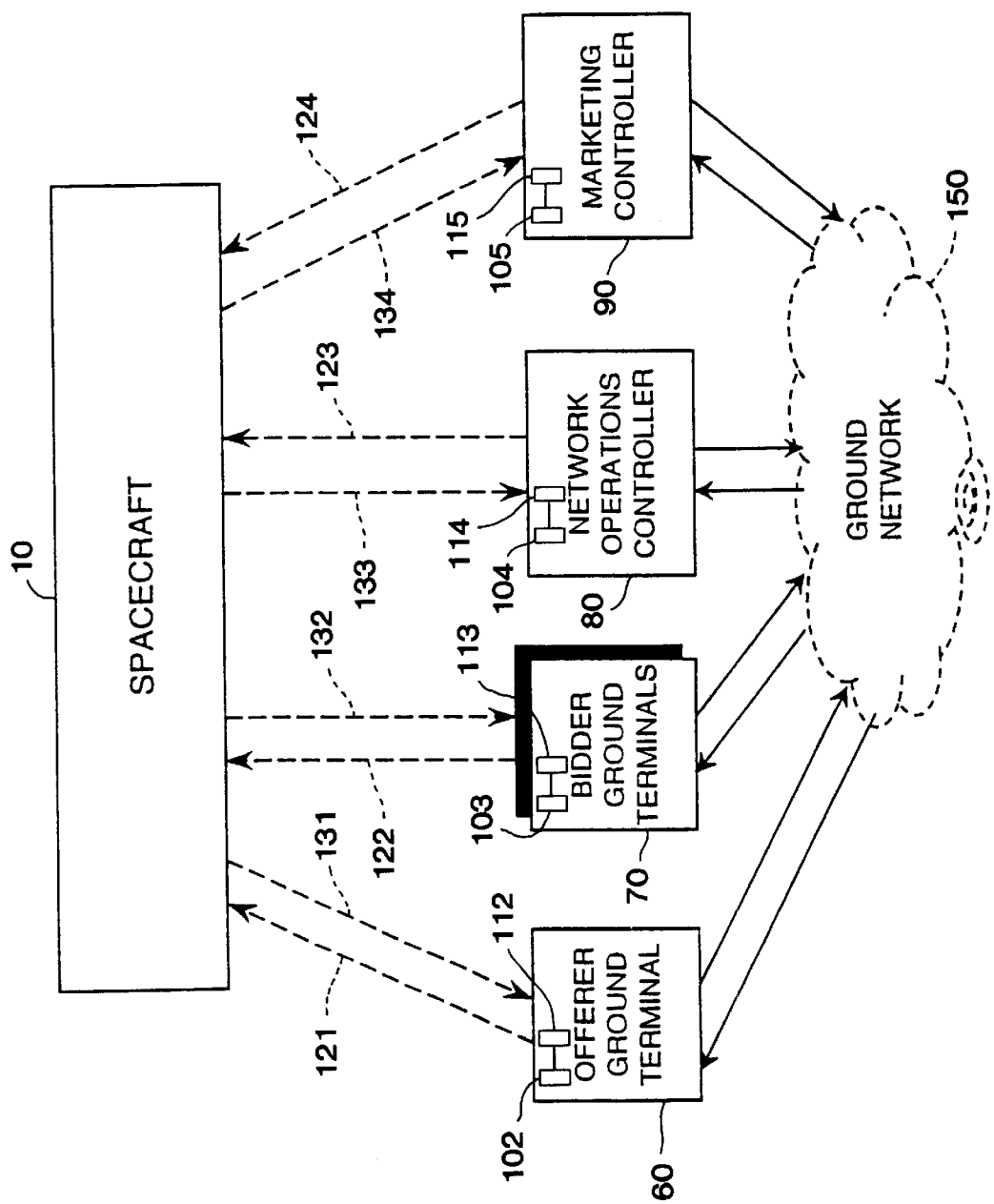
FIG. 2 is a schematic block diagram of the type of system shown in FIG. 1 in which the terminals and controllers are also linked by a ground network.

Referring to FIGS. 2 and 9, one embodiment of the invention may include a ground network 150, including ground links 151–156 and a conventional hub 160.

Figure 5:
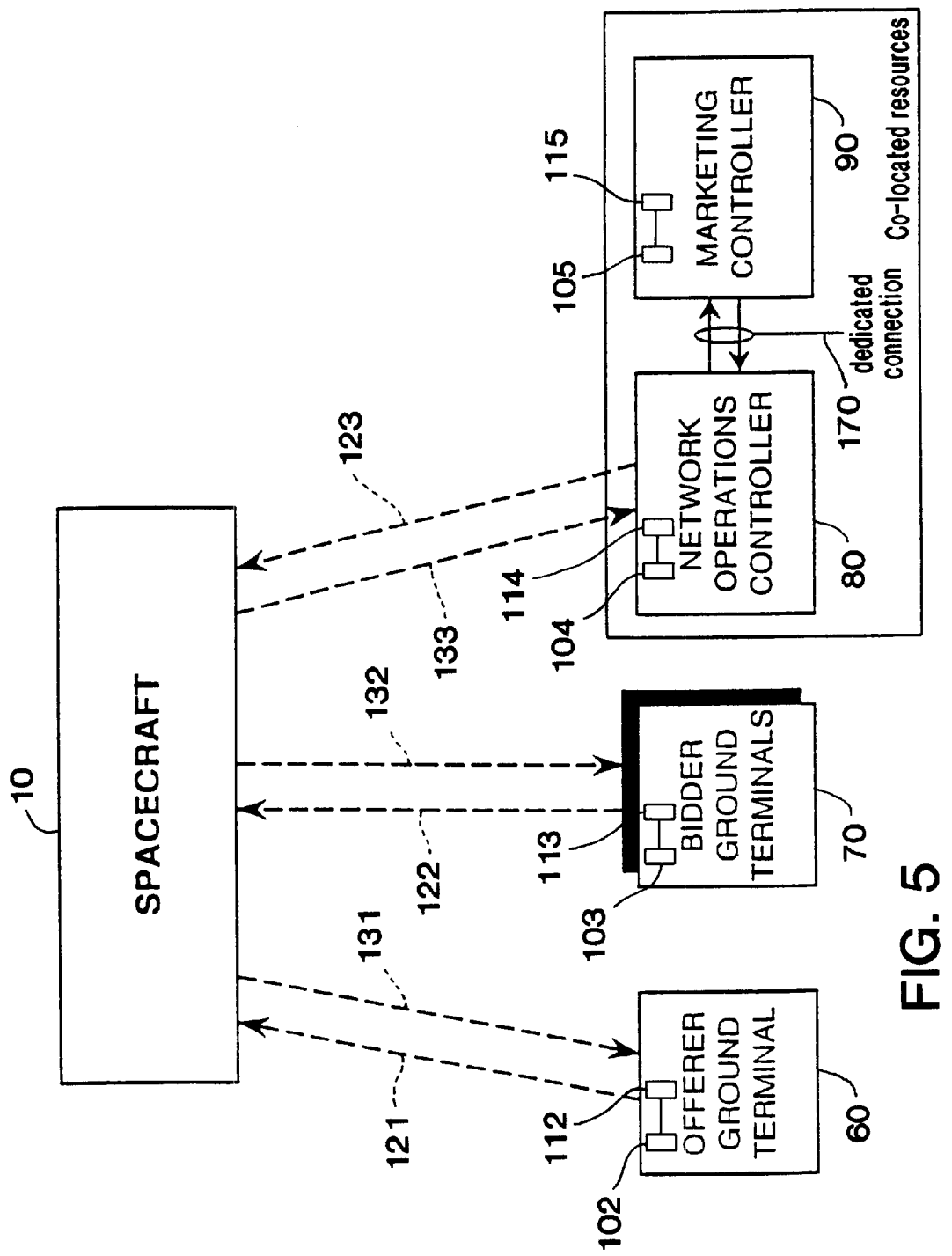
FIG. 5 is a schematic block diagram of the type of system shown in FIG. 1 in which the network operations controller and marketing controller are linked by a dedicated connection.

Referring to FIG. 5, another embodiment of the invention may include a dedicated connection 170 between the operations controller 80 and marketing controller 90.

Figure 6:
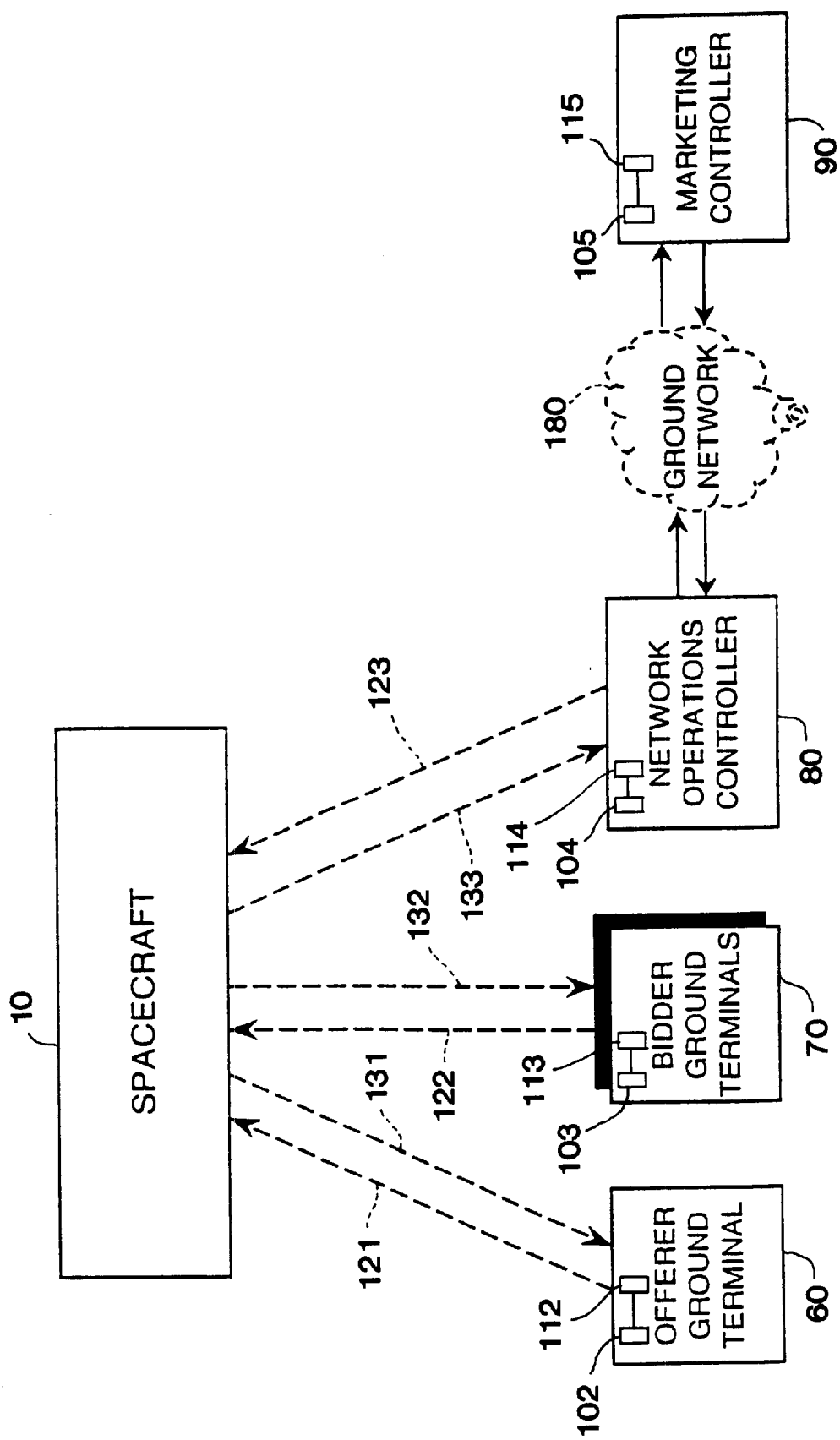
FIG. 6 is a schematic block diagram of the type of system shown in FIG. 1 in which the network operations controller and marketing controller are linked by a ground network.

Referring to FIG. 6, another embodiment of the invention may include a conventional ground network 180 interconnecting network operations controller 80 with marketing controller 90.

Figure 7:
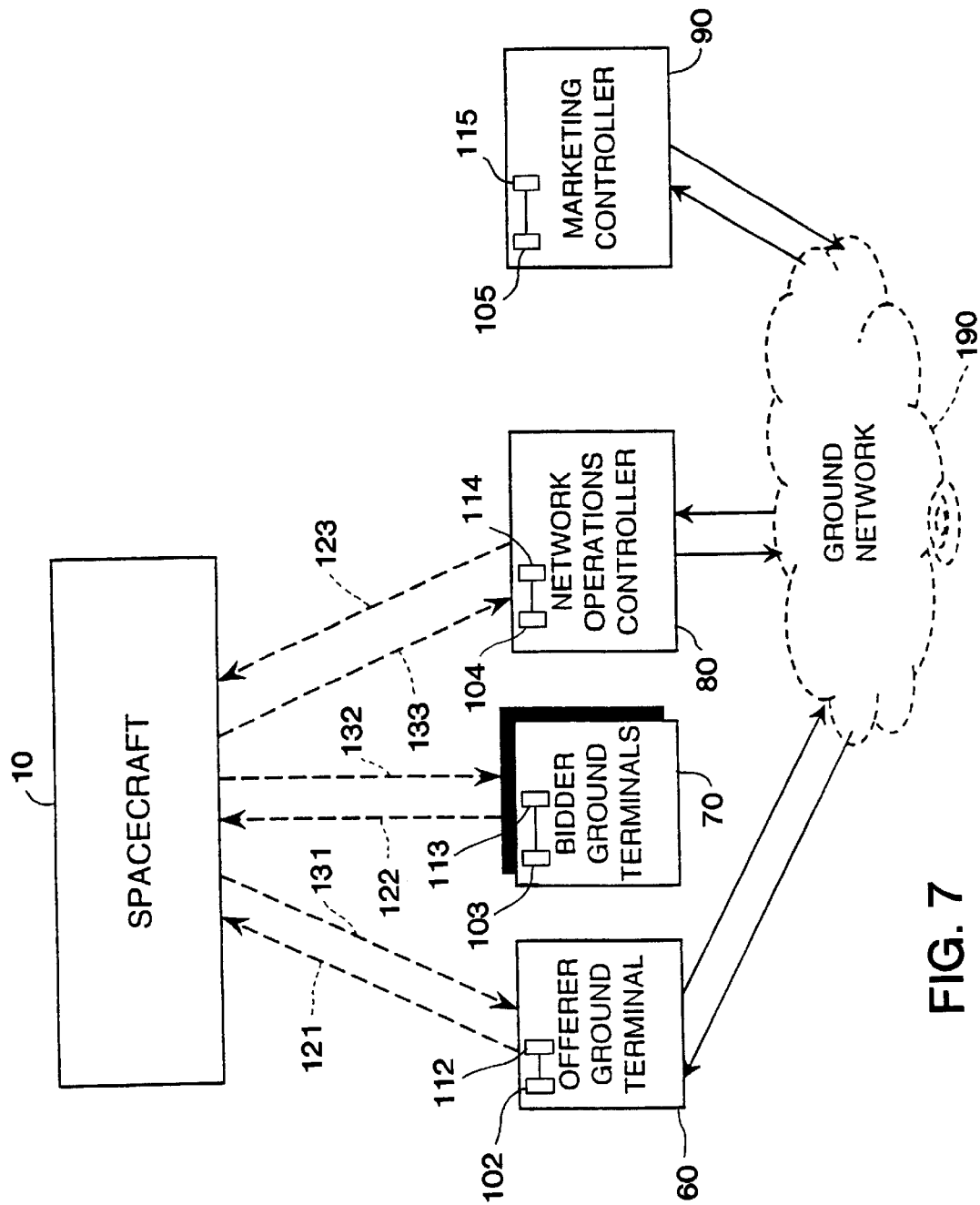
FIG. 7 is a schematic block diagram of the type of system shown in FIG. 1 in which the offerer ground terminal, network operations controller and marketing controller are linked by a ground network and the offerer ground terminal, bidder ground terminals and network operations controller are linked to the satellite by satellite communication links.

Referring to FIG. 7, another embodiment of the invention may include a conventional ground network 190 interconnecting the offerer ground terminal 60, network operations controller 80 and marketing controller 90.

Figure 8:
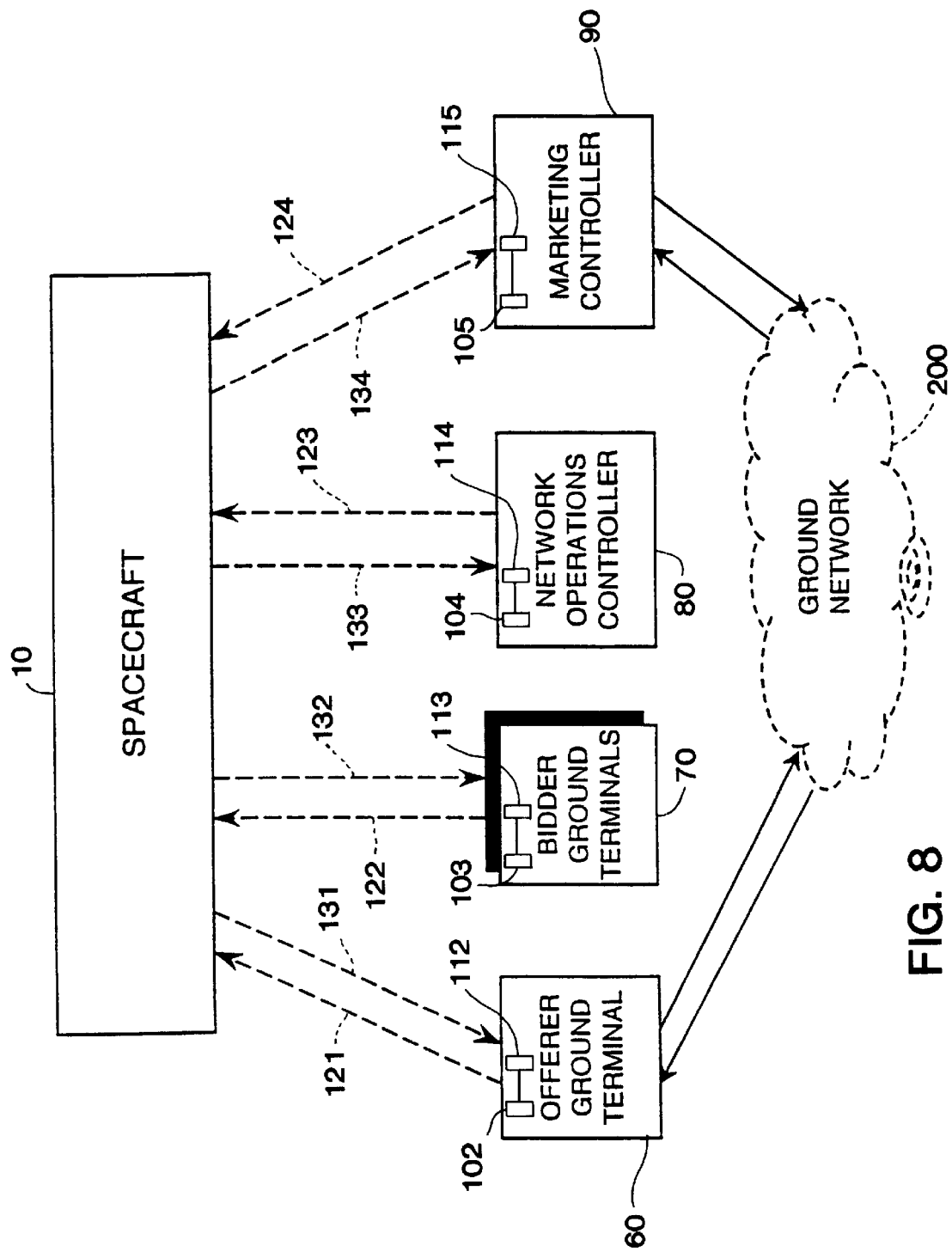
FIG. 8 is a schematic block diagram of the type of system shown in FIG. 1 in which the offerer ground terminal and marketing controller are linked by a ground network.

Referring to FIG. 8, another embodiment of the invention may include a ground network 200 which interconnects offerer ground terminal 60 and marketing controller 90 in a well known manner.

Microprocessor 40 in spacecraft 10 cooperates with downlink module 30 to maintain a satellite downlink schedule which selects satellite resources, which may be bandwidth resources with quality guarantees, purchased or subscribed by wholesalers and retailers for transmittal by a downlink. The apparatus used to operate the schedule is described in detail in the commonly assigned U.S. application Ser. No. 09/270,356 entitled "A Hierarchical Downlink Scheduler for a Processed Satellite Payload" filed on Mar. 16, 1999 in the names of Jaime L. Prieto, Jr., and Jason R. Kincaid, which is incorporated by reference.

Uplink module 20 responds to reservation query messages (RQM) which are transmitted via an uplink to satellite 10 in accordance with techniques for selecting wholesalers and retailers to be given access time for transmitting data to satellite 10. Such techniques are described in detail in commonly assigned U.S. application Ser. No. 09/232,155 entitled "Onboard Control of Demand Assigned Multiple Access Protocol for Satellite ATM Networks," filed Jan. 15, 1999 in the names of Jaime L. Prieto, Jr., and Jason R. Kincaid, which is incorporated by reference and in commonly assigned U.S. application Ser. No. 09/232,157 entitled "Media Access Control Layer for Satellite ATM Networks" filed Jan. 15, 1999 in the name of Jaime L. Prieto, Jr., which is similarly incorporated by reference.

Figure 10:
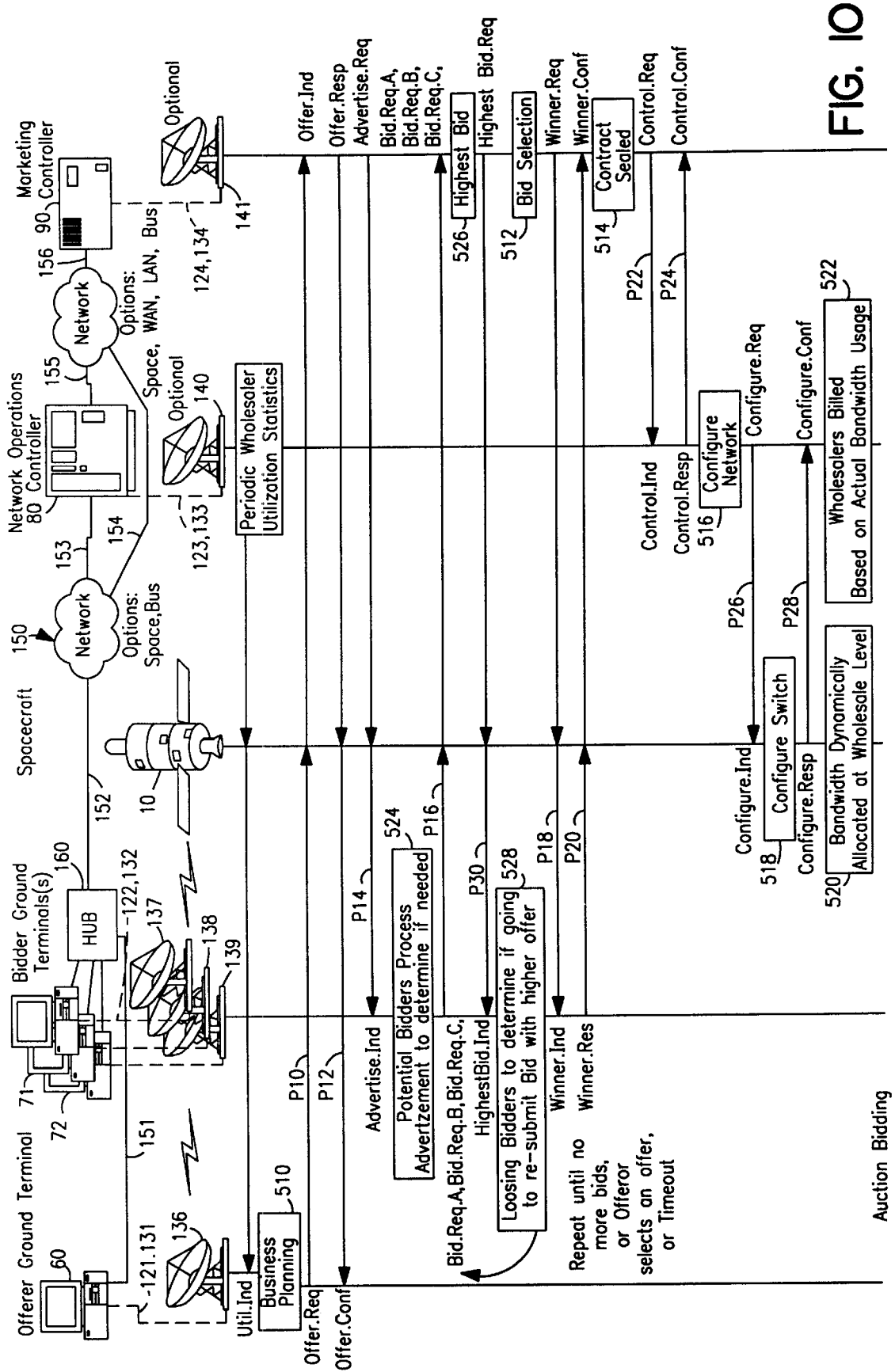
FIG. 10 is a schematic block diagram of the type of system shown in FIG. 1, together with a flow diagram illustrating an auction bidding embodiment of the invention.

The satellite resources which can be scheduled by downlink module 30 include transmission rate, geographic location, including downlink beam, route through the communication network, including satellite 10, duration and quality of service. In order to enable full utilization of the communications resources of satellite 10, the preferred embodiment provides a means of trading the resources through a bid process, including an offer of resources and one or more bids for the offer. The bids preferably are based on the transmission rate at one or more of the resources including geographic location, downlink beam, route through the network, duration and quality of service. As shown in FIGS. 9 and 10, the trading includes blind bids and auction bids.

The invention may be implemented in a variety of ways, some of which are shown in FIGS. 1–8.

FIG. 1 shows an embodiment of the invention in which the spacecraft is linked to ground terminals 60 and 70 and to controllers 80 and 90 through uplinks 121–124 and downlinks 131–134 arranged as shown.

FIG. 2 illustrates an embodiment of the invention like FIG. 1, except that terminals 60 and 70, as well as controllers 80 and 90, also are linked by ground network 150.

FIG. 3 illustrates an embodiment of the invention in which the network operations controller 80 and the marketing controller 90 are located on the satellite 10 and are interconnected by busses 210 and 212. Terminals 60 and 70 are interconnected with satellite 10 through uplinks 121–122 and downlinks 131–132.

FIG. 4 illustrates an embodiment of the invention in which terminals 60 and 70, as well as marketing controller 90, are placed on the ground and are interconnected with satellite 10 through satellite uplinks 121–122 and 124, as well as satellite downlinks 131–132 and 134. The network operations controller 80 is located on the satellite and communicates with the communication module 52 through busses 214 and 216.

FIG. 5 illustrates an embodiment of the invention in which terminals 60 and 70, as well as controllers 80 and 90, are located on the ground. Terminals 60 and 70, as well as controller 80, communicate with satellite 10 through the uplinks and downlinks previously described. Controller 80 is interconnected with controller 90 through a dedicated ground connection 170.

FIG. 6 illustrates an embodiment in the invention in which terminals 60 and 70, as well as controllers 80 and 90, are located on the ground. Terminals 60 and 70, as well as controller 80, communicate with satellite 10 through the uplinks and downlinks previously described. Controller 80 is interconnected with controller 90 through a conventional ground network 180.

FIG. 7 illustrates an embodiment of the invention in which terminal 60 and 70, as well as controllers 80 and 90, are located on the ground. Terminals 60 and 70, as well as controller 80, communicate with satellite 10 through the uplinks and downlinks previously described. In addition, a ground network 190 interconnects terminal 60, controller 80, and controller 90.

FIG. 8 illustrates an embodiment of the invention in which terminals 60 and 70 as well as controllers 80 and 90, are located on the ground. Each of the controllers communicates with satellite 10 through the uplinks and downlinks previously described in connection with FIG. 1. In addition, terminal 60 and controller 90 are interconnected through a conventional ground network 200.

Referring to FIG. 9, the blind bidding aspect of the preferred embodiment is explained by reference to logical paths which indicate transmission of data through any of the networks, busses in links shown in FIGS. 1–8. A current subscriber to the resources of satellite 10 examines his utilization of the resources and, through a business plan developed in step 10, decides to offer a portion of the resources for bid through a logical path P10. The offer is transmitted by any of the previously described communication techniques to marketing controller 90 and is stored in memory 115. Processor 105 in marketing controller 90 responds to the offer and transmits a confirmation of the offer to ground terminal 60 through a logical path P12.

Marketing controller 90 also advertises the offer by sending the offer over logical path P14 to various potential bidders, such as those with access to bidder ground terminals 70–72. The bids are stored in the memories of terminals 70–72, such as memory 113 in terminal 70. In step S11, the bidders process the offer to determine whether to submit a bid. One or more of the bidders with access to terminals 7072 responds to the offer, and transmits a blind bid over a logical path P16 to marketing controller 90.

In step S12, processor 105 in marketing controller 90 analyzes the bids in relationship to the offer and selects at least one of the bids. The winning bid is transmitted via logical path P18 to the winning bidder. For example, if the bidder from terminal 70 is the winner, notification of the bid selection is transmitted to terminal 70 and stored in memory 113. The winning bidder responds by sending an acknowledgment to marketing controller 90 along logical path P20. The acknowledgment is stored in memory 115 of marketing controller 90.

In step S14, processor 105 "seals" the contract represented by the offer and the winning bid by transmitting information about the terms of the winning bid to network operations controller 80 along logical path P22. The information is stored in memory 114 of controller 80. Controller 80 responds and acknowledges receipt of the information through logical path P24. The acknowledgment is stored in memory 115 of controller 90.

In step S16, network operations controller 80 at least partially reconfigures the network, including the uplink and downlink schedules for satellite 10, in accordance with the resources subject to the winning bid. The reconfiguration information is transmitted to satellite 10 by controller 80 along logical path P26.

In step S18, processor 40 in satellite 10 reconfigures switch 50 and the schedule in downlink module 30 in accordance with the winning bid based on the information received from controller 80 along logical path P26. Satellite 10 confirms the reconfiguration by sending a message along logical path P28 to network operations controller 80. The message is stored in memory 114.

In step S20, the resources of satellite 10, including the bandwidth of the data communications in satellite 10, are dynamically reallocated at the wholesale and/or retail level in accordance with the winning bid by processor 40. As soon as the resources of satellite 10 begin to be utilized by the winning bidder, network operations controller 80 bills the winning bidder in step S22 based on actual resource usage by the winning bidder.

Referring to FIG. 10, the auction bidding process is carried out in the same manner as the blind bidding process, except that in step S24, the potential bidders process the offer information to determine if they need the satellite resources being offered. Bids are then submitted along logical path P16 in the manner previously described. In step S26, the highest bid is determined by processor 105 in controller 90. The winner, as well as the other bidders, are then notified along logical path P30.

In step S28, the losing bidders determine whether they will resubmit a losing bid with a higher offer. The resubmitted bids are submitted along logical path P16 in the manner previously described. The highest bid again is selected in step S26, and the process continues until no further losing bids are resubmitted. At that point in time, the bid selection is completed in step S12. From step S12 until step S22, the process is the same as described in connection with the blind bidding shown in FIG. 9.

Those skilled in the art will recognize that the preferred embodiments may be altered and modified without departing from the true spirit and scope of the invention as defined in the accompanying claims. For example, the apparatus and method of the network operations controller 80 and marketing controller 90 may be combined into a single module. Microprocessors 40 and 102–105 may comprise microcontrollers, microsequencers or hard-wired logic units capable of data processing. The reconfiguration conducted by controller 80 may be carried out entirely in satellite 10.

What is claimed is:

1. In a satellite communication system comprising an earth orbiting satellite for transmitting data in accordance with a schedule of satellite resources, apparatus for trading the satellite resources comprising in combination:
one or more memories storing an offer of at least a portion of said satellite resources and bids for the offered satellite resources;
one or more processors analyzing the bids, selecting at least one of the bids and altering the schedule of satellite resources in accordance with each selected bid; and
a communication network interconnecting the one or more memories, one or more processors and the satellite, whereby the resources are traded.

2. Apparatus, as claimed in claim 1, wherein the resources comprise one or more of transmission rate, geographic location, route through the network, duration and quality of service.

3. Apparatus, as claimed in claim 2, wherein the bids are based on the resource of transmission rate at one or more of the resources of geographic location, route through the network, duration and quality of service.

4. Apparatus, as claimed in claim 3, wherein bids comprise blind bids.

5. Apparatus, as claimed in claim 3, wherein the bids comprise auction bids.

6. Apparatus, as claimed in claim 3, wherein the bids comprise resubmitted losing bids.

7. In a satellite communication system comprising an earth orbiting satellite for transmitting data in accordance with a schedule of satellite resources, apparatus for trading the satellite resources comprising in combination:
one or more memories storing an offer of at least a portion of said satellite resources and bids for the offered satellite resources, said one or more memories being located in a ground-based marketing controller;
one or more processors analyzing the bids, selecting at least one of the bids and altering the schedule of satellite resources in accordance with each selected bid, said one or more processors comprising a first processor located in the marketing controller for analyzing the bids and selecting at least one of the bids and a second processor located in a ground-based network operations controller for at least partially altering the schedule in accordance with the selected bid; and
a communication network interconnecting the one or more memories, one or more processors and the satellite, whereby the resources are traded.

8. Apparatus, as claimed in claim 7, wherein the network comprises a satellite link interconnecting the satellite with a first terminal of an offerer of the offer, a second terminal of a submitter of a one of the bids, the marketing controller and the network operations controller.

9. Apparatus, as claimed in claim 8, wherein at least some of the one or more memories are located in the second terminal, and wherein the satellite link transmits the offer to the second terminal.

10. Apparatus, as claimed in claim 8, wherein the network further comprises a ground-based network interconnecting the first terminal, second terminal, marketing controller and network operations controller.

11. Apparatus, as claimed in claim 7, wherein the network comprises a satellite link interconnecting the satellite with a first terminal of an offerer of the offer, a second terminal of a submitter of one of the bids and the network operations controller and further comprises a ground-based dedicated connection interconnecting the marketing controller with the network operations.

12. Apparatus, as claimed in claim 7, wherein the network comprises a satellite link interconnecting the satellite with a first terminal of an offerer of the offer, a second terminal of a submitter of one of the bids and the network operations controller and further comprises ground-based network interconnecting the marketing controller with the network operations controller.

13. Apparatus, as claimed in claim 7, wherein the network comprises a satellite link interconnecting the satellite with a first terminal of an offerer of the offer, a second terminal of a submitter of one of the bids and the network operations controller and further comprises a ground-based network interconnecting the first terminal, the marketing controller and the network operations controller.

14. Apparatus, as claimed in claim 7, wherein the network comprises a satellite link interconnecting the satellite with a first terminal of an offerer of the offer, a second terminal of a submitter of one of the bids, the marketing controller and the network operations controller and wherein the network further comprises a ground network interconnecting the first terminal and the marketing controller.

15. In a satellite communication system comprising an earth orbiting satellite for transmitting data in accordance with a schedule of satellite resources, a method for trading the resources comprising in combination:
   storing an offer of at least a portion of said satellite resources;
   storing bids for the offered satellite resources;
   analyzing the bids;
   selecting at least one of the bids; and
   altering the schedule, whereby the resources are traded.

16. A method, as claimed in claim 15, wherein the resources comprise one or more of transmission rate, geographic location, route through the network, duration and quality of service.

17. A method, as claimed in claim 16, wherein the bids are based on the resource of transmission rate at one or more of the resources of geographic location, route through the network, duration and quality of service.

18. A method, as claimed in claim 17, wherein bids comprise blind bids.

19. A method, as claimed in claim 17, wherein the bids comprise auction bids.

20. A method, as claimed in claim 17, wherein the bids comprise resubmitted losing bids.

21. In a satellite communication system comprising an earth orbiting satellite for transmitting data in accordance with a schedule of satellite resources, a method for trading the resources comprising in combination:
   storing an offer of at least a portion of said satellite resources;
   storing bids for the offered satellite resources;
   analyzing the bids;
   selecting at least one of the bids; and
   altering the schedule, whereby the resources are traded, said steps of storing an offer, storing bids, analyzing the bids, and selecting at least one of the bids being performed on the ground and the step of altering the schedule being performed at least partially on the ground.

22. A method, as claimed in claim 21, wherein the method further comprises transmitting the offer, bids, selected bid and at least partially altered schedule between the satellite and the ground.

23. A method, as claimed in claim 22, and further comprising transmitting the offer, bids, selected bid and at least partially altered schedule between locations on the ground.

24. A method, as claimed in claim 21, and further comprising transmitting the offer, bids, and at least partially altered schedule between the satellite and the ground and transmitting the selected bid to a ground location.

25. A method, as claimed in claim 21, and further comprising transmitting the offer, bids, and at least partially altered schedule between the satellite and the ground and transmitting the offer, selected bid, and at least partially altered schedule also on the ground.

26. A method, as claimed in claim 21, and further comprising transmitting the offer, bids, and at least partially altered schedule between the satellite and the ground and also transmitting the offer and at least partially altered schedule on the ground.

27. In a satellite communication system comprising an earth orbiting satellite for transmitting data in accordance with a schedule of satellite resources, apparatus for trading the satellite resources comprising in combination:
   one or more memories storing an offer of at least a portion of said satellite resources and bids for the offered satellite resources, said one or more memories being located in a marketing controller in the satellite;
   one or more processors analyzing the bids, selecting at least one of the bids and altering the schedule of satellite resources in accordance with each selected bid, said one or more processors comprising a first processor located in the marketing controller in the satellite for analyzing the bids and selecting at least one of the bids and a second processor located in the network operations controller in the satellite for at least partially altering the schedule in accordance with the selected bid; and
   a communication network interconnecting the one or more memories, one or more processors and the satellite, whereby the resources are traded, said communication network comprising a satellite link interconnecting the satellite with a first terminal of an offerer of the offer and a second terminal of a submitter of one of the bids and further comprising a network within the satellite interconnecting the marketing controller and the network operations controller.

28. In a satellite communication system comprising an earth orbiting satellite for transmitting data in accordance with a schedule of satellite resources, apparatus for trading the satellite resources comprising in combination:
   a communication module located in the satellite;
   one or more memories storing an offer of at least a portion of said satellite resources and bids for the offered satellite resources, said memories being located in a ground-based marketing controller;
   one or more processors analyzing the bids, selecting at least one of the bids and altering the schedule of satellite resources in accordance with each selected bid, said one or more processors comprising a first processor located in the marketing controller for analyzing the bids and selecting at least one of the bids and a second processor located in a network operations controller in the satellite for at least partially altering the schedule in accordance with the selected bid; and
   a communication network interconnecting the one or more memories, one or more processors and the satellite, whereby the resources are traded, said communication network comprising a satellite link interconnecting the communication module in the satellite with a first terminal of an offerer of the offer, a second terminal of a submitter of one of the bids and the marketing controller and further comprising a network within the satellite interconnecting the communication module in the satellite with the network operations controller in the satellite.

29. In a satellite communication system comprising an earth orbiting satellite for transmitting data in accordance with a schedule of satellite resources, a method for trading the resources comprising in combination:
   storing an offer of at least a portion of said satellite resources;

storing bids for the offered satellite resources;

analyzing the bids;

selecting at least one of the bids, and altering the schedule, whereby the resources are traded, said steps of storing an offer, storing bids, analyzing the bids, selecting at least one of the bids, and altering the schedule being performed in the satellite.

30. In a satellite communication system comprising an earth orbiting satellite for transmitting data in accordance with a schedule of satellite resources, a method for trading the resources comprising in combination:

storing an offer of at least a portion of said satellite resources;

storing bids for the offered satellite resources;

analyzing the bids;

selecting at least one of the bids; and altering the schedule, whereby the resources are traded, said steps of storing an offer, storing bids, analyzing the bids and selecting at least one of the bids being performed on the ground and the step of altering the schedule being performed in the satellite.

* * * * *